United States Patent
Ghera et al.

(12) 
(10) Patent No.: US 6,611,641 B2
(45) Date of Patent: Aug. 26, 2003

(54) METHOD AND APPARATUS FOR A HIGHLY EFFICIENT, HIGH PERFORMANCE OPTICAL AMPLIFIER

(75) Inventors: Uri Ghera, Tel Aviv (IL); Yoav Sintov, Petach Tivka (IL); Reuven Zaibel, Gan Yavne (IL)

(73) Assignee: Redc Optical Networks Ltd., Tel Aviv (IL)

( * ) Notice: Subject to any disclaimer, the term of this patent is extended or adjusted under 35 U.S.C. 154(b) by 89 days.

(21) Appl. No.: 09/984,520

(22) Filed: Oct. 30, 2001

(65) Prior Publication Data

US 2003/0081892 A1 May 1, 2003

(51) Int. Cl.⁷ .......................... G02B 6/26; H04B 10/12; H01S 3/00
(52) U.S. Cl. ................... 385/27; 359/337.1; 359/341.3; 359/341.41; 372/75
(58) Field of Search .............................. 385/24, 27, 37; 359/337.1, 337.4, 337.11, 337.13, 341.4, 341.41, 341.3; 372/6, 75

(56) References Cited

U.S. PATENT DOCUMENTS

| | | |
|---|---|---|
| 5,225,922 A | 7/1993 | Chraplyvy et al. |
| 5,276,543 A | 1/1994 | Olshansky |
| 5,351,325 A | 9/1994 | Miller et al. |
| 5,514,413 A | 5/1996 | Van't Hof et al. |
| 5,812,710 A | 9/1998 | Sugaya |
| 5,963,291 A | 10/1999 | Wu et al. |
| 6,049,413 A | 4/2000 | Taylor et al. |
| 6,215,581 B1 | 4/2001 | Yadlowsky |
| 6,480,329 B2 * | 11/2002 | Sugaya et al. ......... 359/341.42 |
| 2002/0141695 A1 * | 10/2002 | Ghera et al. ................... 385/27 |
| 2002/0186458 A1 * | 12/2002 | Gao et al. ................ 359/341.4 |
| 2003/0016439 A1 * | 1/2003 | Courtois et al. ......... 359/337.4 |

FOREIGN PATENT DOCUMENTS

EP   1094624 A2   9/2000

OTHER PUBLICATIONS

Ranalli et al, "Planar tapped delay line based, actively configurable gain–flattening filter" ECOC 2000 vol. 3, p21.
Optical Fiber Communication Systems L Kozosky, Artech House 1996 p 578–584.
M Tachibana et al, "Erbium doped fiber amplification with flattened gain spectrum" IEEE Photonics Technology Letters vol. 3 pp 118–120, 1991.
Becker et al, Erbium–Doped Fiber Amplifiers Fundamentals and Technology, Academic Press, San Diego, 1999 p 156–161.

* cited by examiner

Primary Examiner—Hemang Sanghavi
(74) Attorney, Agent, or Firm—Mark M. Friedman

(57) ABSTRACT

A high efficiency, high performance optical amplifier includes an amplification stage comprised of two Erbium doped fiber (EDF) gain sections separated by a variable optical attenuator (VOA). A single pump serves to pump both EDF sections. A high dynamic gain range is achieved by an interplay between the action of the VOA, and the pump energy absorption mechanisms in each gain section, which are dominated by the saturation characteristics of each of the EDFs. In a preferred embodiment of the method, input signals are coupled with a pump signal into a first EDF gain section in which the energy absorption mechanisms provide first amplified signals that are correlated with a residual pump signal. At the first EDF gain section output, the combined amplified signals and residual pump signal are decoupled, the amplified signals being attenuated in the VOA while the residual pump signal being routed around the VOA. The attenuated signals and the residual pump signal are recoupled and introduced into the second EDF gain section, in which the energy absorption mechanisms provide gain equalized output signals.

16 Claims, 7 Drawing Sheets

Low Gain

| Total Input Power | 0 | dBm |
|---|---|---|
| Total Output Power | 20 | dBm |
| Flatness | 1 | dB |
| Noise Figure | 7 | dB |

High Gain

| Total Input Power | -17.0 | dBm |
|---|---|---|
| Total Output Power | 20 | dBm |
| Flatness | 1.2 | dB |
| Noise Figure | 6 | dB |

METHOD AND APPARATUS FOR A HIGHLY EFFICIENT, HIGH PERFORMANCE OPTICAL AMPLIFIER

FIELD AND BACKGROUND OF THE INVENTION

Optical amplification is one of the enabling technologies in Wavelength Division Multiplexing (WDM) optical communication systems. Among optical amplifiers in current optical communication systems, the Erbium Doped Fiber Amplifier (EDFA) is the most commonly used. The EDFA gain medium is a silica fiber doped with Erbium ions, which is excited optically by a diode laser, typically at wavelengths 980 nm or 1480 nm. Due to the atomic properties of the Erbium ions in the silica fiber, the gain obtained at each of the wavelengths in an operating range, for example the C-band (1529–1563 nm) is different, and thus signals that enter with the same power into the amplifier can exit with power differences that can reach a few decibels ["Optical Fiber Communication Systems", L. Kozovsky, et. al., Artech House, 1996, p. 578–584]. For the reasons mentioned above, a gain flattening filter (GFF) is usually applied in order to achieve power equalization of the different wavelengths at EDFA output (Charplevy et al., U.S. Pat. No. 5,225,922; M. Tachibana et al. "Erbium doped fiber amplification with flattened gain spectrum" IEEE Photonics Technology Letters, Vol. 3, pp118–120, 1991). Usually GFFs are passive filers (based on technologies such as Bragg gratings, long period gratings and thin film technology), which perform gain equalization for a certain EDFA gain. If an EDFA that is based on a passive GFF is operated at a different gain than the one designated by its manufacturer, its output is not gain-flattened any more.

As advanced optical networks are becoming dynamic and with complicated topologies (e.g. Mesh topology vs. Point-to-Point), the need to operate an EDFA with large dynamic gain range rises. Many technologies have been proposed for transforming the EDFA into a device with a large dynamic range. Some are based on dynamic filters positioned at the amplifier's output or at its mid-stage (for a dual-stage amplifier). Such filters include acousto-optic tunable filters (e.g. Pearson, U.S. Pat. No. 5,514,413 and Olshansky, U.S. Pat. No. 5,276,543), liquid crystal filters (Kuang-Yi Wu, U.S. Pat. No. 5,963,291), and Mach-Zehnder filters (Miller, U.S. Pat. No. 5,351,325, Ranalli et. al., "Planar tapped delay line based, actively configurable gain-flattening filter", ECOC 2000, Vol. 3, p. 21). All such filters have a high excess loss, and require an optical spectrum-analyzing unit for control and operation. These solutions render the EDFA a highly expensive and energy inefficient unit, the latter because of the tunable filter high excess loss.

Another common way to achieve dynamic gain equalization is by using two amplifier stages with opposite gain tilts [Yadlowsky, U.S. Pat. No. 6,215,581B]. Opposite tilt signs are achieved by differentiating the optical pump level for each of the stages. However, it is well known that in this case the dynamic gain equalization range, within a specific flattening tolerance, is limited. Another applicable technique for dynamic gain equalization uses a variable optical attenuator (VOA) inserted in front of the amplifier (Sugaya, U.S. Pat. No. 5,812,710) or between the amplifier's stages (Taylor, U.S. Pat. No. 6,049,413), to lower the signal power and accommodate the need for optimized gain for power equalization. However, it is well known to those skilled in the art that this technique wastes energy, and degrades the amplifier's signal to noise characteristics. In order to improve the noise figure (NF) of an EDFA with a mid-stage VOA, Tomofuji et al. (EP 1,094,624A2) suggested constructing the first amplifying stage from two optical amplifiers and a VOA inserted between them. Yadlowsky, in U.S. Pat. No. 6,215,581B further suggested using both a VOA and a GFF, and separating the VOA from the GFF with an amplifying stage. Though this configuration improves significantly the noise figure of a large dynamic gain EDFA, adding a gain element between the VOA and GFF wastes energy, and either requires an additional pump source or splitting one pump source into two pump lines, each connected to a gain element before and after the VOA. Since each pump line is independent, this technique limits also the dynamic range of the gain that the amplifier can be operated in.

There is thus a widely recognized need for, and it would be highly advantageous to have a highly efficient EDFA having a high dynamic gain range and a low NF throughout the whole gain range over a wide spectral span. Therefore, it is a primary object of the present invention to provide a technique based on the use of a VOA and on the saturation properties of the erbium doped fiber (EDF) (which controls the pump-to-signal conversion efficiency—see for example "Erbium-doped Fiber Amplifiers", P. C. Becker, et al., p. 156–161, Academic Press, 1999) to achieve within one stage of the EDFA a maximal gain range with optimal power efficiency and low noise figure.

SUMMARY OF THE INVENTION

The present invention is of a rare-earth doped fiber amplifier, specifically an EDFA, with a high dynamic gain range. The EDFA may contain a single gain stage or multiple gain stages, with an optional gain flattening filter inserted between successive stages, for achieving spectrally flattened signals at the EDFA's output. The dynamic gain range is achieved by an interplay between the action of a VOA positioned between two EDF gain sections of one of the EDFA stages, and the pump energy absorption mechanisms at each gain section, which are dominated by the saturation characteristics of the EDF comprising each of the gain sections before and after the variable attenuator. Hereinafter, this EDFA stage is called the Dynamic Gain ("DG") stage.

In the DG stage, the same pump is feeding both EDF gain sections in a way that the residual pump power coming out of the first EDF section feeds the second section. In contrast with prior art, the residual power pumping the second section is typically "passive" in the sense that it is mainly determined by the energy absorption in the first section, and not actively by the sole pump. The VOA located between the two EDF gain sections of the DG stage affects only the output signals of the first section. A main object of the present invention is to utilize the VOA and the pump absorption relations between the two EDF sections in a way that renders the amplification of the DG stage more efficient, in terms of pump signal effective use and NF reduction, while enlarging the dynamic gain range in which the amplifier maintains a flattened output, over a wide spectral range.

According to one embodiment of the present invention there is provided an apparatus for amplifying a plurality of optical signals having different wavelengths, the optical signals entering at an input port and exiting at an output port of the apparatus, the apparatus comprising two, first and second fiber gain sections, each of the sections having a section input port and a section output port, a variable optical attenuator inserted between, and in optical communication with, the two fiber gain sections, a pump coupled to both the gain sections, the pump producing a main pump signal used to pump the first gain section, and a residual pump signal used to pump the second gain section, and means to control the attenuation of the variable optical attenuator, whereby the combined action of the two fiber gain sections and the variable optical attenuator provides dynamic gain equalization of the optical signals over a wide spectral range.

According to further features in the apparatus of the present invention there is provided a first coupler for coupling the input optical signals and the main pump signal into the first gain section, the coupled signals leaving the first gain section at its output port as first output optical signals, a second coupler for decoupling the first output signals into a residual pump power signal and into first amplified optical signals, the first amplified signals being input to the variable optical attenuator to obtain first attenuated optical signals, and the residual pump power signal being routed around the variable optical attenuator, and a third coupler for coupling the first attenuated signals and the residual pump power signal into the second fiber gain section, the second gain section outputting dynamically gain equalized amplifier output signals at the amplifier output port. Preferably, the fiber sections are made of Erbium doped fiber According to another embodiment of the present invention there is provided a dual-stage apparatus for amplifying a plurality of optical signals having different wavelengths, comprising an amplification stage for providing first amplified signals, the amplification stage including two, first and second fiber gain sections, each of the sections having a section input port and a section output port, a variable optical attenuator inserted between and in optical communication with the two fiber gain sections, a pump coupled to both the gain sections, the pump producing a main pump signal used to pump the first gain section, and a residual pump signal used to pump the second gain section, the residual pump signal determined by energy absorption mechanisms in the first gain section, and means to control the attenuation of the variable optical attenuator and a booster stage in optical communication with the amplification stage for receiving the first amplified signals and for outputting high power dynamically gain equalized output signals. Preferably, the fiber sections are made of Erbium doped fiber.

According to the present invention there is further provided a method for dynamically gain equalizing optical signals having an input power level, comprising: providing an amplification stage having two, first and second fiber gain sections, providing a variable optical attenuator optically connected between the two fiber gain sections, using a single pump to pump the first fiber gain section and obtain first section amplified signals correlated with a residual pump power signal, attenuating the first section amplified signals in the attenuator to obtain first attenuated signals, and amplifying the attenuated signals in the second gain section while pumping the second gain section with the residual pump signal, thereby obtaining dynamically gain equalized signals. Preferably, the fiber sections are made of Erbium doped fiber According to additional features in the method of the present invention, the residual pump power signal is determined by the absorption properties of the Er-fiber comprising the first gain section and by the input power level of the optical signals entering the first section.

The present invention successfully addresses the shortcomings of the presently known configurations by providing a method and apparatus for a highly efficient, high performance Er-fiber optical amplifier that employs one pump and a variable attenuator to achieve dynamic gain equalization over a large dynamic range.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and apparatus for a high efficiency, high performance optical amplifier. Specifically, the present invention can be used to achieve within one stage of an EDFA a maximal gain range, with optimal power efficiency and low noise figure.

The high dynamic gain range is achieved by an interplay between the action of a VOA positioned between two EDF gain sections of one of the EDFA stages, and the pump energy absorption mechanisms at each gain section, which are dominated by the saturation characteristics of each of the EDF sections.

The principles and operation of a high performance optical amplifier with maximal gain range, optimal power efficiency and low noise figure according to the present invention, may be better understood with reference to the drawings and the accompanying description.

Figure 1:
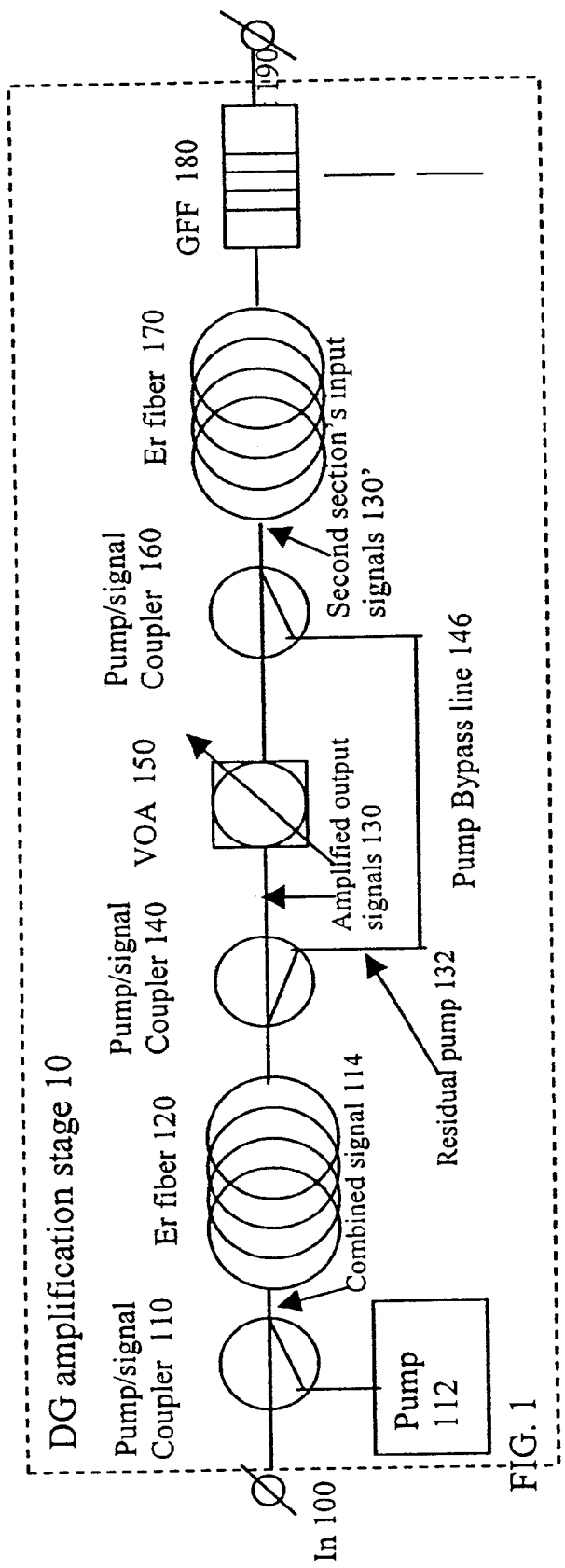
FIG. 1 illustrates a preferred embodiment of a single stage optical amplifier according to the present invention.

Referring now to the drawings, FIG. 1 illustrates a preferred embodiment of a single stage optical amplifier of the present invention. A DG stage 10 has incoming signal channels introduced to an input port 100. A first pump/signal coupler 110, (e.g. a coupler based on biconic fiber fusion or thin film coupling) combines the input signal channels with the signal of a pump 112 into a combined signal 114 that is introduced into a first EDF gain section 120. The output of section 120 consists of amplified output signals 130 combined with a residual pump signal 132.

Inside section 120, the pump signal excites the Erbium ions to its upper level and leads to amplification (gain) of the input signals according to well known principles, explained for example in "Erbium-doped Fiber Amplifiers", P. C. Becker, et al., ch. 5, Academic Press, 1999. The pump-to-signal transfer efficiency is determined on the input signals power at port 100. The higher this signals power, the better the pump-to-signal transfer efficiency in first EDF section 120, since the fiber becomes more saturated as the signals power increases. This increased pump-to-signal efficiency means that more pump power is spent in the first section, and less is left as "residual" to operate on the second section. As a result, the residual pump signal 132 at the output of first EDF section 120 decreases as the input signals power increases, i.e. the two signals are correlated.

Signals 130 and 132 exiting first section 120 are then separated by a second pump/signal coupler 140. Amplified output signals 130 are introduced into, and attenuated by a VOA 150, and are coupled by a third pump/signal coupler 160 into a second EDF gain section 170, along with residual pump signal 132 that bypasses the VOA through a bypass line 146. Residual pump 132 is used to pump second EDF gain section 170, which amplifies the signals attenuated by VOA 150. An optional GFF 180 may spectrally flatten the signals amplified by second EDF gain section 170. The flattened signals are introduced to an output port 190 of amplification stage 10.

Figure 2:
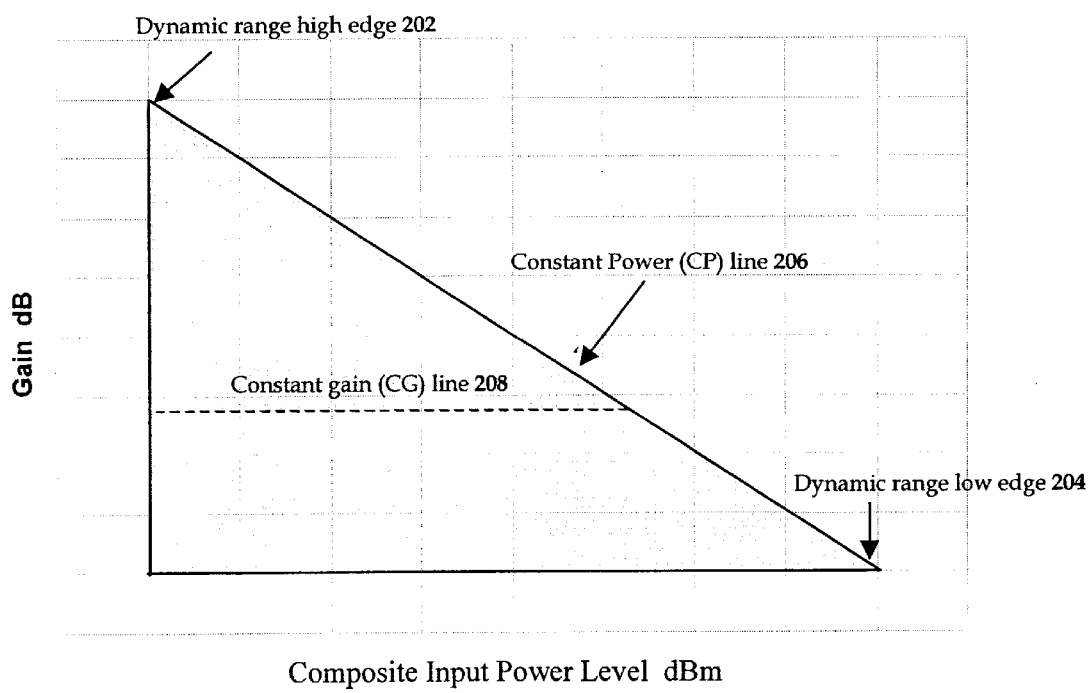
FIG. 2 is a schematic illustration of the dynamic gain range of an EDFA.

The dynamic gain range of an EDFA, according to the present invention, is schematically shown in FIG. 2, where the shaded area in the drawing denotes the operating range of the amplifier. The two edges of the dynamic range in which the overall gain tilt is the worst, are a high-edge 202 of a low input power, high gain working point, and a low-edge 204 of a high input power, low gain working point. Low-edge working point 204 is characterized by the worst NF of the EDFA. The dynamic gain range can be further increased if higher NF values are allowed. A connecting line 206 between the two edges is named the "constant power" (CP) line, and represents the highest output power achieved by the EDFA. Another working mode besides the CP mode is the "constant gain" (CG) mode, illustrated by a CG line 208 in FIG. 2.

Figure 3:
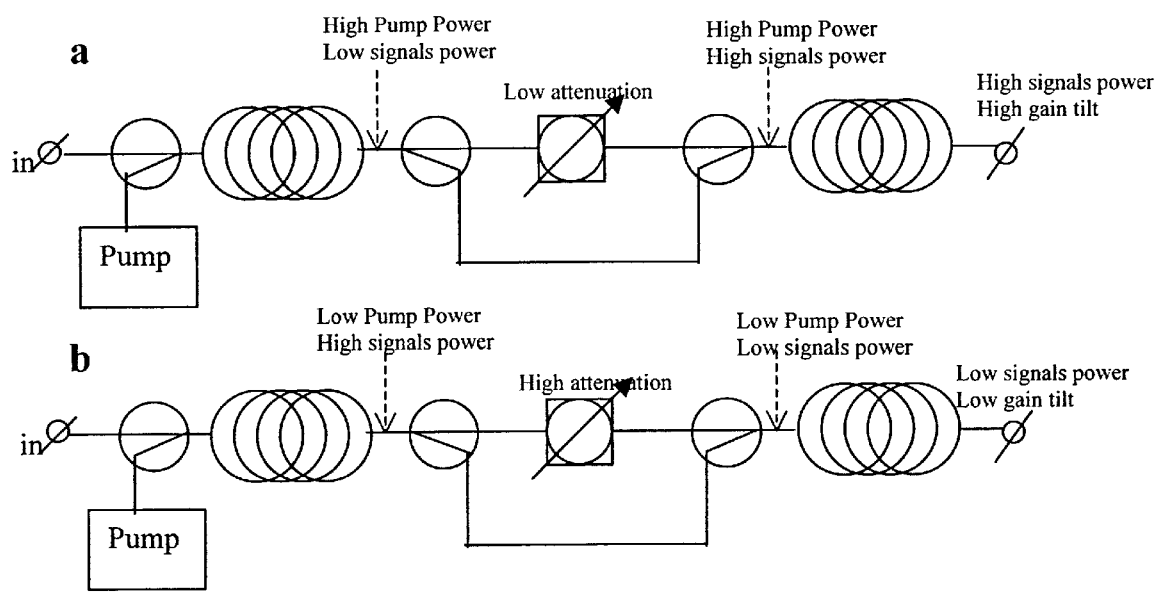
FIG. 3 illustrates the typical functionality of the EDFA embodied in FIGS. 1 and 2.

FIG. 3 illustrates the typical functionality of the EDFA embodied in FIGS. 1 and 2, at the two working points 202 and 204. In (a), when low input power signals (at high gain working point 202) are introduced to input port 100, first EDF gain section 120 shows low pump-to-signal conversion efficiency, because the signals flux is low compared with the saturation flux at the signals wavelength. As a result, the power of output signals 130 is low, while the power of pump signal 132 (correlated with signals 130), which bypasses VOA 150 and enters second section 170, is high. At this working point, the attenuation of VOA 150 is adjusted externally (typically by an external voltage source controlled by software algorithms) to its minimal value, so that the power of output signals 130 is almost identical to that of input signals 130' entering second EDF gain section 170. Alternatively, when high power signals (at low gain working point 204) are introduced to input port 100, as illustrated in FIG. 3(b), first EDF section 120 is deeply saturated. Therefore, the pump-to-signal conversion efficiency is high, as explained previously, resulting in high output power signals 130 and low residual pump power 132 at the output of gain section 120. The attenuation of VOA 150 at this working point is adjusted to a high value, lowering the power of signals 130' entering second EDF section 170, without affecting the level of pump power 132 that bypasses the VOA and is delivered to the second EDF section. The VOA attenuation degree at each of the edge working points and the fiber lengths at each of the EDF gain sections of the DG stage, are chosen to provide, using the mechanisms described above, a similar spectrum shape at the DG stage output for both high gain working point (low input power) and low gain working point (high input power). However, due to the actions described above, optimal equalization along the entire working range is reached with a spectral tilt penalty and output power changes, where at the high gain point the spectral tilt is positive (low wavelength channels are more amplified than high wavelength channels) and the output power is high with respect to the tilt achieved at the low gain point. This result is due to a higher residual pump 132 at the first EDF section output at the high gain working point. Because the output power and spectral tilt of second section 170 are slightly higher at the high gain working point, as illustrated in FIG. 2, pump signal 112 is adjusted to different levels at each working point in order to compensate for these small differences. In addition, the channels spectral profile can be flattened at all working points within the dynamic gain range by optional GFF 180.

The control over the pump and VOA attenuation levels is preferably done by extensive software algorithms supported by look-up tables (LUTs), which provide the attenuation and pump level required for achieving a gain-flattened spectrum at any required gain. Such control schemes are well known to those skilled in the art.

Figure 4:
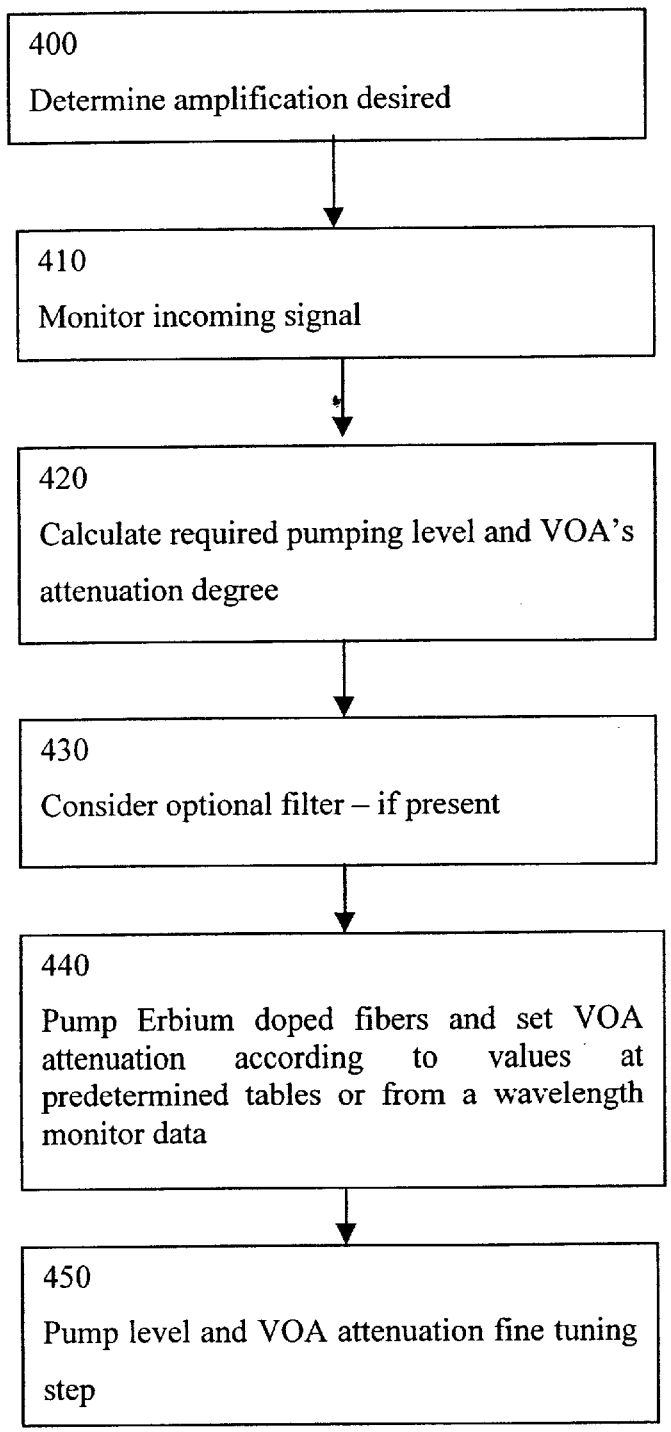
FIG. 4 shows an exemplary process of equalizing the wavelength-distributed channels, using the embodiment of FIG. 1.

An exemplary method or process for equalizing the wavelengths, using the embodiment of FIGS. 1 and 3, is illustrated in FIG. 4. The method is based on a synergistic action that includes pumping of the two gain sections of the DG stage and the VOA attenuation adjustment. At an amplification determination step 400, a processing unit (not shown) determines the amplification that is desired from user input. The power of an incoming signal is monitored at a signal-monitoring step 410. At a calculation step 420, the processing unit calculates (or retrieves data from a predetermined LUT) the required amount of pumping power, or excitation, to be provided to the DG stage, by varying the pump laser power (112 in FIG. 1) and the amount of attenuation required from the VOA (150 in FIG. 1). The presence of a dichroic or other passive gain flattening filter is considered at a filter check step 430. At an execution step 440, the Erbium-doped fibers are pumped to the desired level, and the VOA attenuation is adjusted to the required value. The degree of optical pumping and VOA attenuation desired are determined by considering of a number of factors, including: (1) the input and output power of the associated Erbium-doped fiber amplifier, (2) the data regarding properties of the dichroic filter, if any, (3) the data in a look-up table providing Erbium-doped optical fibers properties of both gain sections forming the DG section, (4) ambient temperature, and (5) information regarding the specific wavelengths transmitted by the fiber—if existing. After adjusting the pump power and the VOA attenuation to the predetermined level, a fine-tuning step 450 takes place. The gain achieved at the first EDF section is monitored through its input and output detectors, and the pump power is adjusted to meet the required gain (determined by a suitable LUT) at the specific working point. Fixing the first EDF section to the required gain automatically determines the gain of the second EDF section. This is a special feature of the present invention, unlike that of prior art apparatii and methods. The overall DG stage gain fine tuning adjustment is done through adjusting the VOA attenuation while monitoring the overall gain by input and output detectors, until the required overall gain is achieved.

Figure 5:
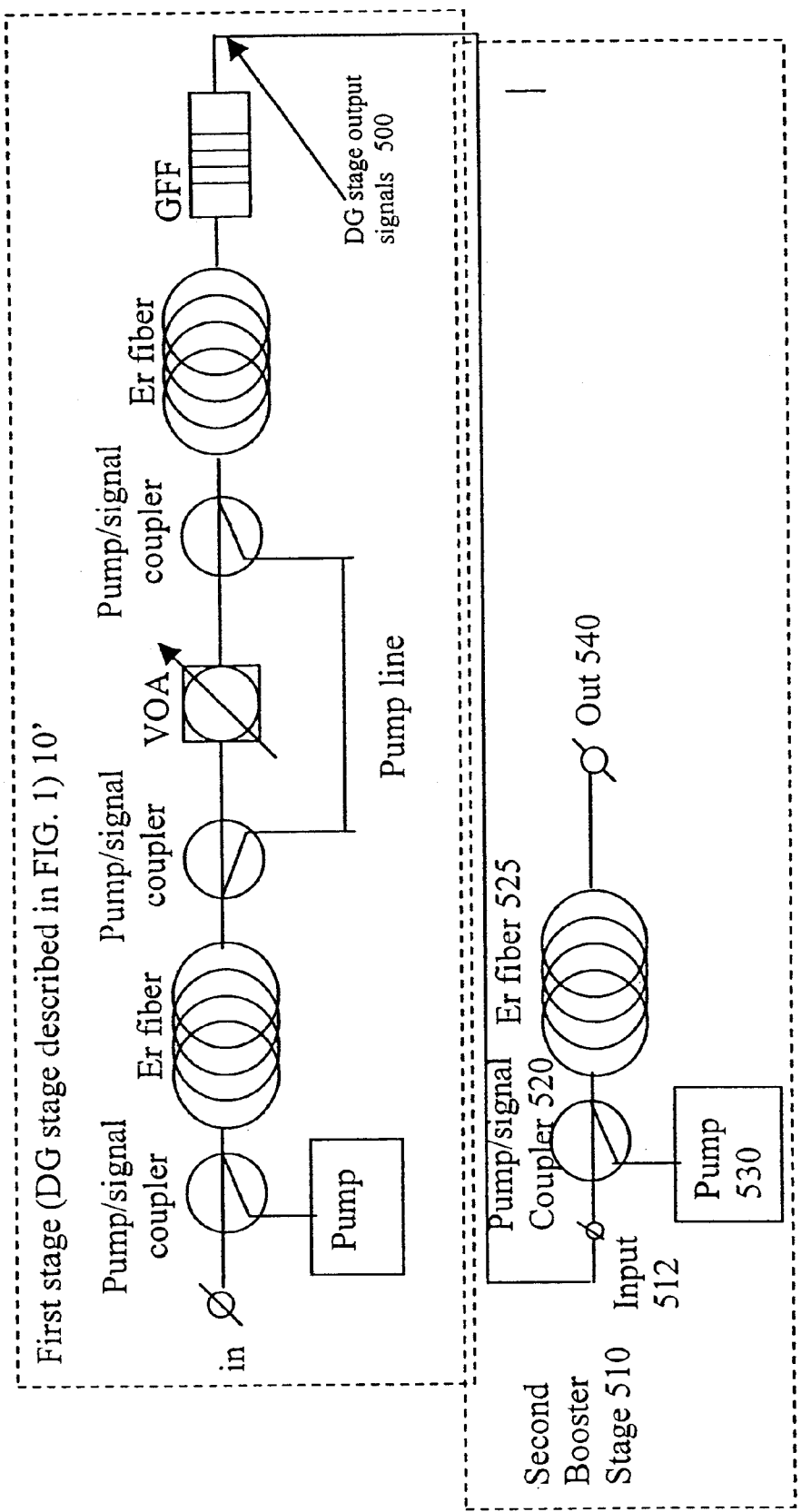
FIG. 5 illustrates a preferred embodiment of a dual-stage optical amplifier according to the present invention.

The amplification stage described above can be used as a stand-alone gain element with a high dynamic gain range, or can be incorporated in a dual-stage amplifier, as illustrated in another preferred embodiment in FIG. 5. In this embodiment, the response of a first DG stage for each working point is as described above, while a second stage is used as a power booster for achieving the required high power levels.

In FIG. 5, output signals 500 of a DG stage 10' exiting through output port 190, are coupled to a boosting stage 510 through an input port 512. The boosting stage is comprised of a pump/signal coupler 520, a third fiber (preferably Er-doped) gain section 525, and a pump outputting a second pump signal 530. Pump signal 530 is coupled to Erbium-doped fiber 525 along with signals 500 through pump/signal coupler 520. The boosted signals are coupled out of the Erbium-doped fiber 525 through an output port 540. In this case, adjusting the pump level 112 of the first stage, as described in the previous embodiment, is redundant, since the combined output power along with the spectral tilt reduction trend of the DG stage, as the input power increases, fulfills the flattening requirements of the whole amplifier. These flattening requirements include lower power at input 512 of boosting stage 510 as the input power to first DG stage 10' increases, in order to increase the gain tilt and reach a spectrally flattened output profile. In other words, the Erbium saturation mechanism in DG stage 10', which control the pump-to-signal conversion efficiency, as described in FIG. 2, and consequently the residual pump level 132, are used in this configuration to support the dynamic gain equalization of a dual-stage EDFA.

Figure 6:
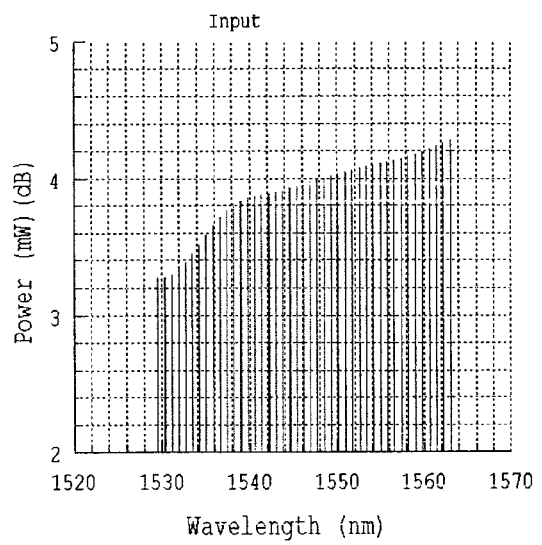
FIG. 6 shows an example of the performance of the full C-Band 17 dB dynamic gain range dual-stage EDFA of the present invention.
Figure 6:
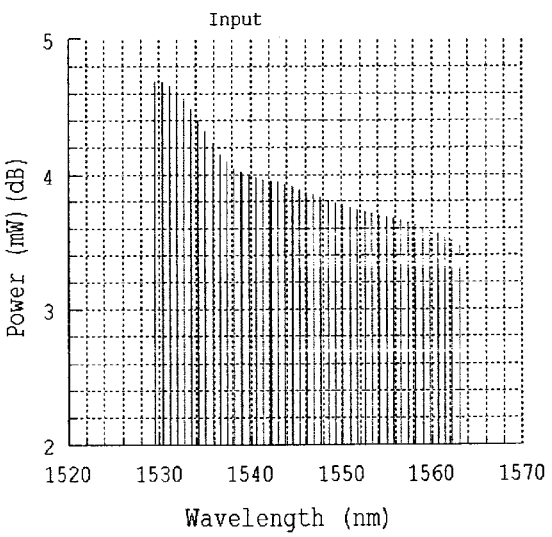

FIG. 6 shows an example of the performance of the full C-Band (1529–1563 nm) dynamic gain dual-stage EDFA of the present invention, as embodied by the preferred embodiment of FIG. 5. which employs an optimal combination of Er-fiber with a VOA at the DG stage midst. The EDFA shows a 17 dB dynamic gain range. The EDFA is comprised of identical Erbium-doped fibers in both stages, and a GFF with a holding peak attenuation of 6 dB and a 0.5 dB insertion loss between the two stages. The GFF is designed to achieve gain-equalized signals at the output port of the dual stage amplifier (540 in FIG. 5). Each Erbium doped fiber has a core diameter of 3 μm, Erbium and Aluminum dopings of 0.1% wt. and about 10% wt., respectively, and a Numerical Aperture of 0.23. The fiber lengths are 10 m and 8 m in the DG stage's first and second sections, respectively, and 14 m in the second booster stage. The pumps of both stages are of 250 m Watt at 980 nm wavelength. At the low edge of the dynamic range (FIG. 6(a)), where the VOA attenuation is adjusted to its maximal value (12 dB), the gain tilt, as expected, is negative and its value reaches 1 dB. At the high edge of the dynamic range (FIG. 6(b)), where the VOA attenuation is adjusted to its minimal value (0.5 dB), the gain tilt, as expected, is positive and its value reaches 1.2 dB. The output power is the same at these two edges and along the "constant power line" connecting them. A constant gain operating regime is possible as well, and is illustrated also in FIG. 7 as a "constant gain line".

Figure 7:
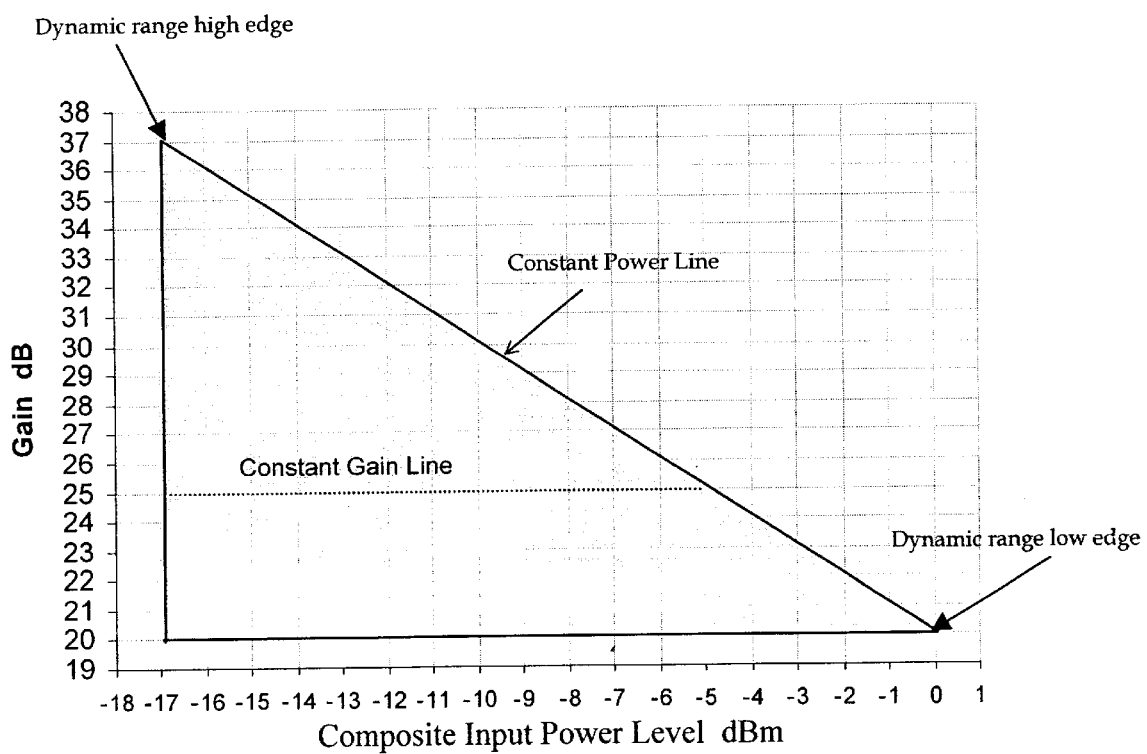
FIG. 7 shows a diagram of a 17 dB dynamic gain dual stage EDFA operating range.

The dynamic gain range of the embodiment of FIG. 5 is shown in FIG. 7, where the shaded area in the drawing denotes the operating range of the amplifier. Within 1.2 dB flattening tolerance, the dynamic gain range reaches 17 dB over the entire C-Band. The two edges of the dynamic range in which the overall gain tilt is the worst are also shown in FIG. 7. The dynamic gain range achieved in this example, is limited to 17 dB due to a 7 dB NF constraint. The dynamic gain range can be further increased if higher NF values are allowed. The method and apparatus of the present invention are closest to the one proposed in U.S. Pat. No. 6,215,581B1, mentioned above. However, in U.S. Pat. No. 6,215,581B1, each amplification section is fed by an independent pump source, yielding a similar output power for each working point, and thus requiring independent pump adjustment for each amplification section, for achieving the required dynamic gain range. In contrast, in the present invention, a single pump is used for both EDF sections of the DG stage, with the pumping level of the second section dependent on the pump-to-signal conversion in the first. This is unlike prior art single pump uses, in which a single pump has its power split and routed to both gain sections, the pumping of each section controlled independently. The physics of the Erbium ions pump-to-signals conversion interplay, combined with the action of the VOA inserted between the two EDF sections, are able to deliver the same spectral dynamic characteristics as the two separate pumps for two separately controlled stages in the mentioned prior art. Thus, a large saving in pump energy, and much simpler and easier pump control management functions are realized. As a consequence of the much more efficient pump energy use, it is possible to reach a larger dynamic range with much less pump power by utilizing an EDFA with a single pump. Moreover, in the present invention the inherent output power reduction trend of the DG stage, while keeping the spectral profile relatively constant, as the required gain is reduced, fulfills the flattening requirements of the entire dual-stage EDFA.

As mentioned before, the control over the pumps and VOA attenuation levels is preferably done in this embodiment by extensive software algorithms supported by LUTs. These algorithms calculate accurately the VOA attenuation and pumps level according to Gain required, input power, ambient temperature and spectral profile of the GFF and the signals entering, in such a way that the output spectrum of the amplifier is gain flattened at the required gain or output power.

The method of equalizing the wavelengths using the embodiment of FIG. 5 is similar to that of the previous embodiment, illustrated in FIG. 4, except that the second boosting stage pump level adjustment considerations should also be taken into account for steps parallel to 420, 440 and 450 in FIG. 4.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. An apparatus for amplifying a plurality of optical signals having different wavelengths, the optical signals entering at an input port and exiting at an output port of the apparatus, the apparatus comprising:
   a. two, first and second fiber gain sections, each of said sections having a section input port and a section output port,
   b. a variable optical attenuator inserted between and in optical communication with said two fiber gain sections,
   c. a pump coupled to both said gain sections, said pump producing a main pump signal used to pump said first gain section, and a residual pump signal correlated with the amount of pumping of said first gain section and used to pump said second gain section, and
   d. means to control the attenuation of said variable optical attenuator, whereby the combined action of said two fiber gain sections and said variable optical attenuator provides dynamic gain equalization of the optical signals over a wide spectral range.

2. The apparatus of claim 1, wherein said fiber sections include Erbium-doped fiber sections.

3. The apparatus of claim 2, wherein said Erbium-doped fiber sections are identical.

4. The apparatus of claim 2, further comprising:

e. a first coupler for coupling said input optical signals and said main pump signal into said first gain section, said coupled signals leaving said first section at its said output port as first output optical signals, f. a second coupler for decoupling said first output signals into a residual pump power signal and into first amplified optical signals, said first amplified signals being input to said variable optical attenuator to obtain first attenuated optical signals, and said residual pump power signal being routed around said variable optical attenuator, and g. a third coupler for coupling said first attenuated signals and said residual pump power signal into said second fiber gain section, said second gain section outputting dynamically gain equalized amplifier output signals at the amplifier output port.

5. The apparatus of claim 4, further comprising an optional gain flattening filter connected to said amplifier output port.

6. A dual-stage apparatus for amplifying a plurality of optical signals having different wavelengths, comprising:

a. an amplification stage for providing first amplified signals, said amplification stage further characterized by having first and second fiber gain sections and a single pump coupled to both said gain sections, said pump producing a main pump signal used to pump said first gain section, and a residual pump signal correlated with the amount of pumping of said first gain section and used to pump said second gain section, and b. a booster stage in optical communication with said amplification stage for receiving said first amplified signals and for outputting high power dynamically gain equalized output signals.

7. The apparatus of claim 6, wherein said amplification stage further includes i. a variable optical attenuator inserted between and in optical communication with said two fiber gain sections, and ii. means to control the attenuation of said variable optical attenuator.

8. The apparatus of claim 6, wherein said power booster stage further includes:

i. a third fiber gain section;

ii. a second pump for producing a second pump signal for pumping said third fiber gain section, and iii. a coupler for coupling said first amplified signals and said second pump signal into said third fiber gain section to obtain high power dynamically gain equalized signals.

9. The apparatus of claim 7, wherein said fiber sections include Erbium-doped fiber sections.

10. The apparatus of claim 9, wherein said Erbium-doped fiber sections are identical.

11. The apparatus of claim 9, wherein said amplification stage further includes:

iii. a first coupler for coupling said input optical signals and said main pump signal into said first gain section, said coupled signals leaving said first section at its said output port as first output optical signals, iv. a second coupler for decoupling said first output signals into a residual pump power signal and into first amplified optical signals, said first amplified signals being input to said variable optical attenuator to obtain first attenuated optical signals, and said residual pump power signal being routed around said variable optical attenuator, and v. a third coupler for coupling said first attenuated signals and said residual pump power signal into said second fiber gain section, said second gain section outputting said first amplified signals to said booster stage.

12. A method for dynamically gain equalizing optical signals having an input power level, comprising:

a. providing an amplification stage having two, first and second fiber gain sections, b. providing a variable optical attenuator optically connected between said two fiber gain sections, c. using a single pump to pump said first fiber gain section and obtain first section amplified signals correlated with a residual pump power signal, d. attenuating said first section amplified signals in said attenuator to obtain first attenuated signals, and e. amplifying said attenuated signals in said second gain section while pumping said second gain section with said residual pump signal, thereby obtaining dynamically gain equalized signals.

13. The method of claim 12, wherein said fiber gain sections include Er-doped fibers.

14. The method of claim 13, wherein said Er-doped fibers are identical.

15. The method of claim 13, wherein said step of using a single and obtain a correlated residual pump power signal is further characterized in that the correlated residual pump power signal is determined by absorption properties of said Er-fiber and by the input power level of the optical signals.

16. The method of claim 12, further comprising optically coupling a booster stage to said amplification stage for increasing the power of the gain equalized optical signals.

* * * * *